US008989035B2

(12) United States Patent
Damji et al.

(10) Patent No.: US 8,989,035 B2
(45) Date of Patent: Mar. 24, 2015

(54) METHOD FOR POWER SAVING FOR WIRELESS DEVICE IN DISCONTINUOUS RECEPTION MODE

(75) Inventors: Navid Damji, Cupertino, CA (US); Longda Xing, San Jose, CA (US); Zhu Ji, San Jose, CA (US); Johnson O. Sebeni, Fremont, CA (US); Jianxiong Shi, Dublin, CA (US); Sree Ram Kodali, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 13/542,259

(22) Filed: Jul. 5, 2012

(65) Prior Publication Data

US 2013/0258876 A1 Oct. 3, 2013

Related U.S. Application Data

(60) Provisional application No. 61/616,794, filed on Mar. 28, 2012.

(51) Int. Cl.
| | |
|---|---|
| *H04J 1/16* | (2006.01) |
| *H04J 3/14* | (2006.01) |
| *H04L 1/00* | (2006.01) |
| *H04L 12/26* | (2006.01) |
| *H04W 52/02* | (2009.01) |
| *H04W 36/00* | (2009.01) |
| *H04W 76/04* | (2009.01) |

(52) U.S. Cl.
CPC ...... *H04W 52/0254* (2013.01); *H04W 36/0088* (2013.01); *H04W 76/048* (2013.01); *Y02B 60/50* (2013.01)
USPC ........................................................ 370/252

(58) Field of Classification Search
CPC ... H04W 24/00; H04L 43/50; H04L 43/0852; H04L 43/08; H04B 17/003
See application file for complete search history.

(56) References Cited

U.S. PATENT DOCUMENTS

| | | | |
|---|---|---|---|
| 6,208,861 B1 | 3/2001 | Suzuki | |
| 6,385,460 B1 | 5/2002 | Wan | |
| 7,844,265 B2 | 11/2010 | Kuchibhotla et al. | |
| 2008/0207195 A1* | 8/2008 | Ranta et al. | 455/423 |
| 2010/0009643 A1 | 1/2010 | Haartsen | |
| 2010/0120443 A1 | 5/2010 | Ren | |
| 2010/0137013 A1 | 6/2010 | Ren | |

(Continued)

OTHER PUBLICATIONS

International Search Report and Written Opinion in Application No. PCT/US2013/033700, mailed Jul. 10, 2013, pp. 1-10.

(Continued)

*Primary Examiner* — Hassan Phillips
*Assistant Examiner* — Prenell Jones
(74) *Attorney, Agent, or Firm* — Meyertons, Hood, Kivlin, Kowert & Goetzel, P.C.; Erik A. Heter

(57) ABSTRACT

A methodology for determining a periodicity of a neighbor cell search for a cellular mobile device is disclosed. The neighbor cell searches may be conducted during discontinuous reception (DRX) paging cycles. However, instead of performing a neighbor cell search during each DRX paging cycle, the period for performing a neighbor cell search may be adaptively determined. Various metrics may be used in determining the periodicity for neighbor cell searches. In various embodiments, two or more metrics may be utilized in combination to determine the neighbor cell search periodicity.

21 Claims, 7 Drawing Sheets

(56) References Cited

U.S. PATENT DOCUMENTS

| | | | |
|---|---|---|---|
| 2011/0117954 A1* | 5/2011 | Iwamura et al. | 455/525 |
| 2011/0136530 A1 | 6/2011 | Deshpande | |
| 2011/0305159 A1 | 12/2011 | Hofmann et al. | |
| 2012/0014343 A1 | 1/2012 | Womack et al. | |
| 2012/0202480 A1* | 8/2012 | Franklin et al. | 455/423 |
| 2012/0252455 A1* | 10/2012 | Martin et al. | 455/436 |
| 2012/0320879 A1* | 12/2012 | Martin et al. | 370/332 |
| 2013/0084866 A1* | 4/2013 | Martin et al. | 455/436 |

OTHER PUBLICATIONS

"3rd Generation Partnership Project; Technical Specification Group Radio Access Network; Requirements for support of radio resource management (FDD) (Release 11)", 3GPP TS 25.133 V11.0.0, Mobile Competence Centre, Sophia-Antipolis Cedex, France, vol. RAN WG4, Mar. 18, 2012; pp. 1-270.

International Preliminary Report on Patentability from PCT/US2013/033700, issued Oct. 9, 2014, pp. 1-7.

Office Action from Taiwanese Application No. 102110999, issued Sep. 22, 2014, English and Chinese versions, pp. 1-21.

* cited by examiner

METHOD FOR POWER SAVING FOR WIRELESS DEVICE IN DISCONTINUOUS RECEPTION MODE

This application claims priority to U.S. provisional patent application Ser. No. 61/616,794, entitled "Method for Power Saving for Wireless Device in Discontinuous Reception Mode", filed Mar. 28, 2012.

BACKGROUND

1. Technical Field

This disclosure is directed to wireless communications devices, and more particularly, to methods for saving power in a radio receiver implemented in a wireless communications device.

2. Description of the Related Art

In recent years, wireless devices such as smart phones and tablet computers have become increasingly sophisticated. In addition to supporting telephone calls, many mobile devices now provide access to the internet, email, text messaging, and navigation using the global positioning system (GPS). Furthermore, many mobile devices are capable of operating sophisticated applications, many of which may utilize the functionality mentioned above.

The large amount of incorporated functionality can place a significant strain on the battery life of a mobile device. As a result, many devices incorporate a variety of power saving features. Generally speaking, portions of circuitry in a wireless may be powered down when not in use in order to save power and conserve battery life.

One significant consumer of power in a wireless device is transmitter and receiver circuitry (hereinafter 'wireless circuitry') that enables wireless communications. A power saving technique has been developed in recent years to save power in wireless circuitry is known as discontinuous reception (or DRX). In devices utilizing DRX, portions of wireless circuitry may be powered down if there is no information (e.g., packets) to be received or transmitted. The wireless circuitry may periodically be powered on to determine if there is information to be received, and subsequently powered back down again if such a determination indicates that no new information is incoming. In one exemplary method, a device utilizing DRX may determine from a header in a transmitted packet if the information contained therein is incoming for that device. If the information is not relevant to that device, then circuitry may be powered down for at least a portion of the remainder of the packet, and subsequently powered on before the next header. Polling is another technique that may be used, wherein a device may periodically send a beacon to an access point or base station to determine if there is any information waiting for reception. If no information is awaiting reception, portions of the wireless circuitry may be powered down until the next beacon is to be transmitted.

In addition to determining if information is awaiting reception by the mobile device, neighbor cell searching may be conducted during the time when the wireless circuitry is powered up while operating in a DRX mode. Neighbor cell searching may be performed in order to enable cell reselection and handover of the mobile device from one cell to another.

SUMMARY

A methodology for determining a periodicity of a neighbor cell search for a cellular mobile device is disclosed. The neighbor cell searches may be conducted during discontinuous reception (DRX) paging cycles. However, instead of performing a neighbor cell search during each DRX paging cycle, the period for performing a neighbor cell search may be adaptively determined. Various metrics may be used in determining the periodicity for neighbor cell searches. In various embodiments, two or more metrics may be utilized in combination to determine the neighbor cell search periodicity.

The cellular mobile device may be one of a number of different types of devices, including a cellular telephone/smart phone or a tablet computer. The cellular mobile device may utilize DRX to conserve power and thus battery life. Accordingly, at least some of the wireless circuitry in the cellular mobile device may be powered down when not receiving or transmitting information. Periodic activation of the wireless circuitry to determine if there is traffic to be received may be referred to as a DRX paging cycle.

BRIEF DESCRIPTION OF THE DRAWINGS

The following detailed description makes reference to the accompanying drawings, which are now briefly described.

Figure 1A:
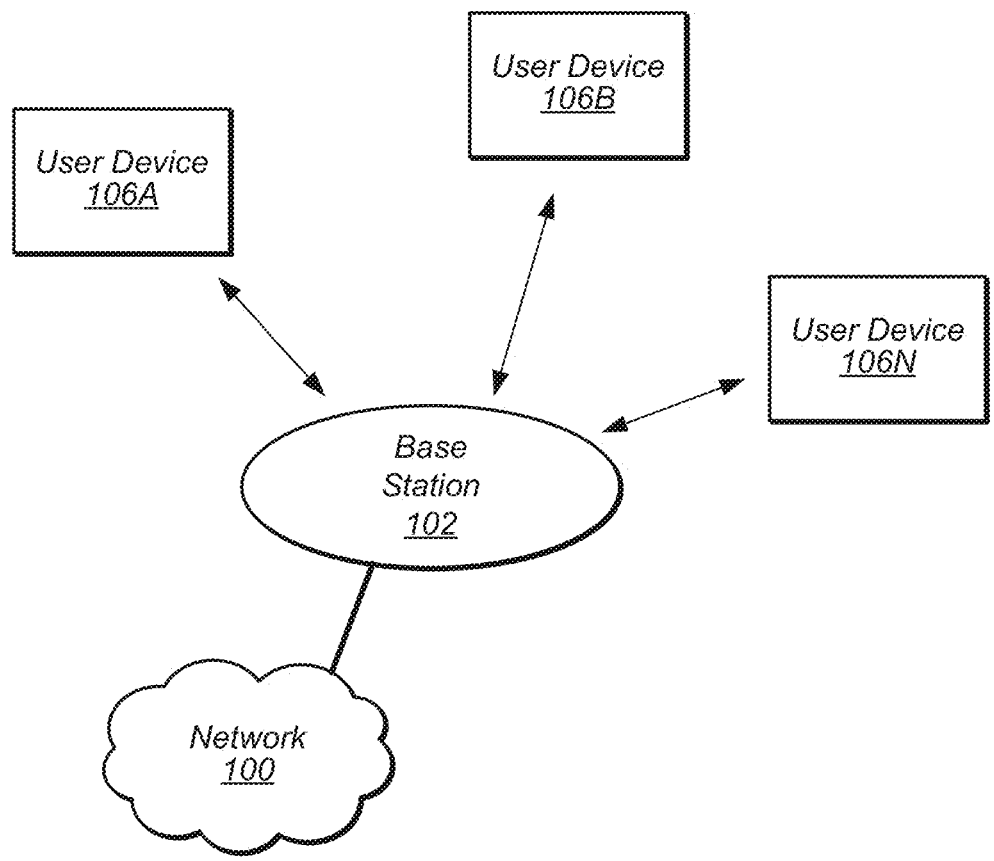
FIG. 1A illustrates an exemplary (and simplified) wireless communication system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description.

As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Acronyms

The following acronyms are used in the present Provisional Patent Application:
BLER: Block Error Rate (same as Packet Error Rate)
BER: Bit Error Rate
CRC: Cyclic Redundancy Check
DL: Downlink
DRX: Discontinuous Reception
PER: Packet Error Rate
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System FIG. 1A illustrates an exemplary (and simplified) wireless communication system. It is noted that the system of FIG. 1A is merely one example of a possible system, and embodiments of the invention may be implemented in any of various systems, as desired.

As shown, the exemplary wireless communication system includes a base station 102 which communicates over a transmission medium with one or more UEs 106A through 106N.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc.

Figure 1B:
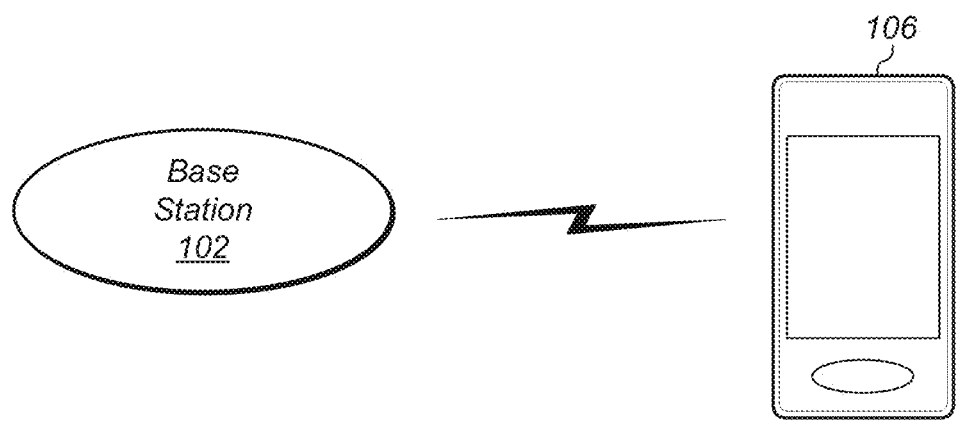
FIG. 1B illustrates a base station 102 in communication with user equipment 106.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include at least one processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to generate one or more channel quality indicators (CQIs) that are provided back to the base station 102. The base station 102 may use these CQIs received from one or more base stations to adjust its communications with the respective UE 106, or possibly other UEs 106. For example, in one embodiment the base station 102 may receive and utilize CQIs from multiple UEs 106 to adjust its communication scheduling among the various UEs within its coverage area (or cell).

User equipment (UE) 106 may use a CQI generation method as described herein to determine the CQI that is fed back to the base station (BS). In one embodiment, the generation of the CQI is performed based on a current communication scenario being experienced by the UE. As described below, during an off-line process, information (e.g., mapping tables) may be generated for different possible communication scenarios, and this information may be stored in the UE. Later, when the UE is actually in use (online), the UE may determine the current communication scenario that it is experiencing and select the pre-stored information (e.g., mapping tables) for use in generating the channel quality indicator (CQI).

Figure 2:
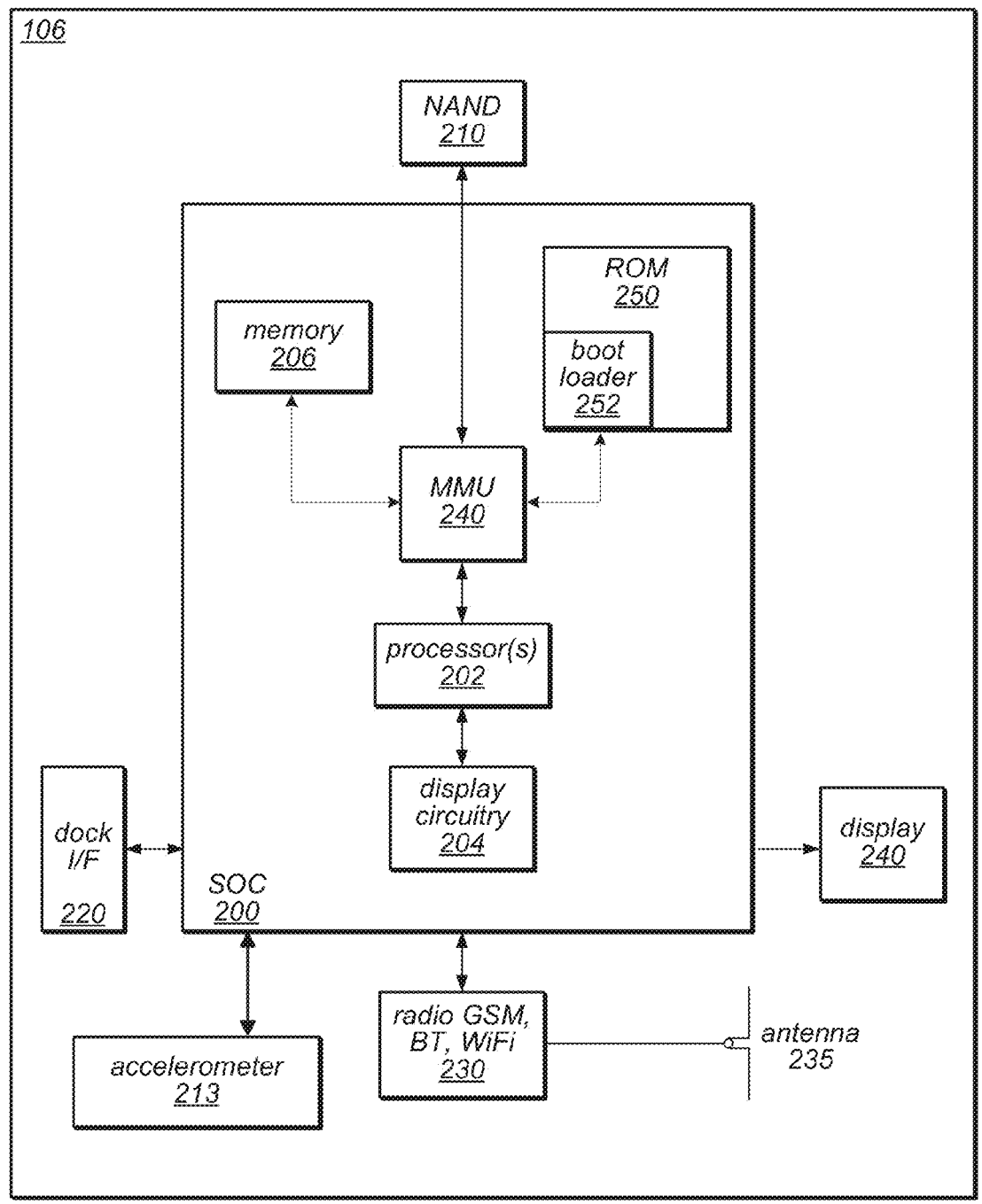
FIG. 2 illustrates an exemplary block diagram of a UE 106, according to one embodiment.

FIG. 2 illustrates an exemplary block diagram of a UE 106. As shown, the UE 106 may include a system on chip (SOC) 200, which may include portions for various purposes. For example, as shown, the SOC 200 may include processor(s) 202 (or processor core(s) 202) which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for GSM, Bluetooth, WiFi, etc.) which may use antenna 235 to perform the wireless communication. As described herein, the UE 106 may include hardware and software components for generating and/or providing CQI values to a base station.

UE 106 in the embodiment shown also includes an accelerometer 213 coupled to SOC 200. Accelerometer 213 may be used to detect the motion of UE 106. In one embodiment, accelerometer 212 may provide indications of velocity (speed and direction of movement) of UE 106. Among other uses, the indications of the velocity of UE 106 may be used in neighbor cell searching and reselection, as discussed in further detail below. Also as discussed below, the velocity indication may be used to determine how often neighbor cell searches are to be conducted. It is further noted that while accelerometer 213 is used to determine velocity in this embodiment, embodiments utilizing other types of functional units (e.g., a global positioning system, or GPS, unit) are possible and contemplated.

UE 106 in the embodiment shown may be configured for operation in a DRX mode, wherein at least certain circuits of radio 230 may be powered down when there is no incoming and no outgoing traffic. The circuits of radio 230 may be periodically powered on to determine if there is any incoming traffic to be received. If no incoming traffic is to be received, the circuits of radio 230 may be powered down again. This cycle may be referred to as a paging cycle. The length of paging cycles in one embodiment may be controlled by processor(s) 202. In some embodiments, information received from ROM 250 may be utilized by processor(s) 202 to determine the length of the paging cycles, including the duration that the corresponding circuitry of radio 230 is on for monitoring for incoming traffic.

In addition to monitoring for incoming traffic during the powered-on portion of a paging cycle, UE 106 may also perform neighbor cell searching. Neighbor cell searching may enable UE 106 to perform cell reselection, which may be performed for various reasons. For example, if UE 106 is moving (e.g., a user of UE 106 is in a moving automobile), the changing location may result in UE 106 selecting new cells in which to communicate. In order to discover cells in which communications may be conducted, UE 106 may perform neighbor cell searching. Accordingly, under the direction of processor(s) 202 and instructions executing thereupon (which may be accessed from memory 206 or ROM 250), various measurements may be performed during portion of a paging cycle in which the circuitry of radio 230 is powered on. These measurements may determine which, if any, neighbor cells are present, as well as which of those are candidates for reselection by UE 106. Performing the measurements may include the transmission and reception of various signals by radio 230. Processor(s) 202 may determine which measurements are to be performed, and may further perform calculations based on the received signals to determine the outcome of a particular measurement.

Performing the required measurements for neighbor cell searching may consume non-trivial amounts of power, thereby impacting the battery life of UE 106. Accordingly, another function that may be performed during each paging cycle is a determination of a periodicity for conducting neighbor cell searching. Based on various metrics determined by measurements taken, processor(s) 202 may determine a period for which neighbor cell searching is to be conducted. This period may be less than once for each paging cycle, and may change in responsive to changes to the environment in which UE 106 is operating. Various methods used by processor(s) 202 to determine the neighbor cell search period are discussed below.

Neighbor cell searching may utilize various types of measurements, based on the frequency of transmitted signals and the radio access technology (RAT) of the cells being measured. The measurement types discussed herein include serving cell measurements, intra-frequency cell measurements, inter-frequency cell measurements, and measurement of inter-RAT cells.

Serving cell measurements measure the signal strength of the cell that is currently serving the UE. In one embodiment, this measurement may be the one that is most frequently taken. For example, in embodiment configured to communicate according to the LTE protocol (Long Term Evolution, also referred to as 4G), the serving cell measurement may be performed once each DRX paging cycle.

Intra-frequency cell measurements are those in which the UE initiates a measurement of intra-frequency neighbor cells (i.e. neighbor cells operating on the same radio frequency, or RF). This measurement may be initiated when at least one of the serving cell's received reference signal power (RSRP) or received signal quality (RSRQ) falls below a respective threshold.

In inter-frequency cell measurements, the UE may detect and measure the relevant measurement quality for inter-frequency neighbors based on network threshold configurations. More particularly, the RF signal may be tuned to different frequencies within a band and determine the measurement quality at each frequency.

The measurement of inter-RAT cells may depend on various thresholds. Inter-RAT cell measurement may include performing measurements according to two or more different technologies/protocols (e.g., a measurement for LTE, another measurement for 3G) that fall within the operational capability of the UE. Using inter-RAT measurements, a UE may determine if it is more beneficial to switch to another technology/protocol. If the signal quality of the serving cell is above a high priority threshold, the UE may search higher priority inter-RAT frequency layers with a certain periodicity. If the signal quality of the serving cells is less than another threshold, the UE may search and measure all inter-RAT cells on configured measurement frequencies.

Figure 3:
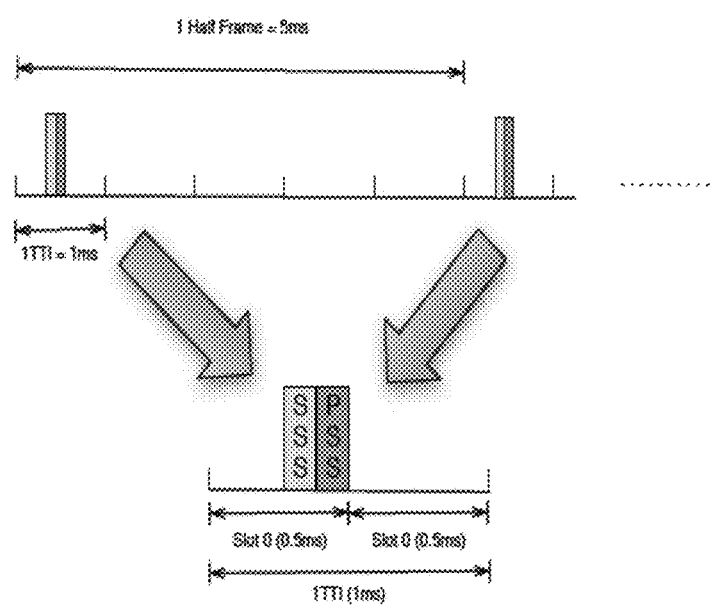
FIG. 3 is a diagram illustrating synchronous sequence transmissions used in neighbor cell searches for one embodiment of a mobile device.

Turning now to FIG. 3, a diagram illustrating synchronous sequence transmissions used in neighbor cell searches for one embodiment of a mobile device is shown. Before neighbor cell measurements can be performed, the UE may detect and synchronize to the neighbor cell by acquiring the known synchronization sequences periodically transmitted from the neighbor cell's base station. The example shown in FIG. 3 is a synchronization procedure used in LTE, in which two different synchronization sequences are transmitted. As shown in FIG. 1, a primary synchronization sequence (PSS) and a secondary synchronization sequence (SSS) are transmitted. The PSS may be formed in the frequency domain using the Zadoff-Chu sequence using specified root indices. The Zadoff-Chu sequence is a mathematical sequence that, when applied to radio signals, gives rise to a signal having a constant amplitude. The SSS may be formed by interleaving two transmitted binary sequences in the frequency domain. In FIG. 1, the PSS/SSS transmission is shown for LTE operating in a frequency division duplexing (FDD) mode. Each of the sequences may be transmitted once every half-frame, which is 5 ms in the illustrated example. The UE may correlate received sequences for more than one neighbor cell, and determine which neighbor cell offers the greatest correlation.

Figure 4:
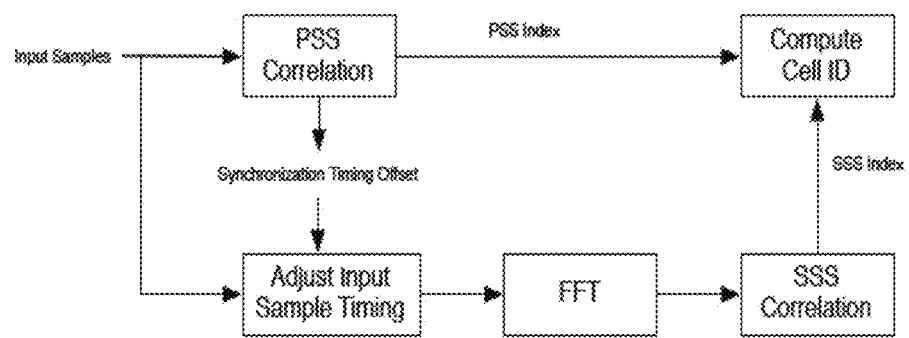
FIG. 4 is a diagram illustrating a correlation mechanism used in neighbor cell searching by one embodiment of a mobile device.

FIG. 4 is a diagram illustrating a correlation mechanism used in neighbor cell searching by one embodiment of a mobile device. More particularly, FIG. 4 illustrates a mechanism through which the PSS and the SSS may be acquired. In one embodiment, the mechanism is implemented in a digital portion of radio unit 230. However, in other embodiments, the mechanism may be implemented elsewhere, including within processor(s) 202.

In the example shown, input samples may be received and provided to a PSS correlator. The input sample may also be received by a timing adjustment unit (e.g., a sample rate converter). The PSS correlation unit may output the PSS index, and may also output a synchronization timing offset signal. The synchronization timing offset signal may be received by the timing adjustment unit, which may adjust the timing of the input samples accordingly. The PSS index be directly output to an identification unit configured to identify the cell from which the input samples are being received. The output of the timing adjustment unit may be provided to a fast Fourier transform (FFT) unit configured to perform an FFT on the sample stream. The output of the FFT unit may be provided to an SSS correlation unit configured to perform a correlation operation. The results of the correlation operation may be output as the SSS index to the identification unit. Using both the PSS index and the SSS index, the identification unit may compute the identification of the cell from which the input samples are being received.

In a wireless channel for a UE, the RF conditions may adversely affect the level of the received signal due to factors such as fading. Additionally, based on the velocity (the speed and direction of movement of the UE), neighbor cells may become candidates for reselection at various times. For example, if the UE is moving slowly, certain neighbor cells may not appear in its reception sphere for a longer time. Conversely, if the UE is moving fast, certain neighbor cells may appear in its reception sphere at a faster rate. Accordingly, the rate at which neighbor cell searches may be a factor in determining cell reselection performance.

Table 1 as shown below is a table taken from the 3GPP Specification that provides requirements for maximum cell detection times for intra-frequency neighbor cells. The columns, from left to right, are the DRX cycle length, the number of cycles to detect a neighbor cell, the number of cycles to evaluate a neighbor cell, and the number of cycles to evaluate a neighbor cell. Since the velocity of a UE is a factor in cell reselection performance, the figures in Table 1 below may be varied in accordance with the velocity to ensure cell detection.

TABLE 1

| DRX Cycle Length (s) | $T_{detect}$ (s), (number of DRX cycles) | $T_{measure}$ (s), (number of DRX cycles) | $T_{evaluate}$ (s), (number of DRX cycle) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32 (25) | 1.28 (1) | 6.4 (5) |
| 2.56 | 58.88 (23) | 2.56 (1) | 7.68 (3) |

In LTE, operation in the DRX mode may be enabled in both the radio resource control (RRC) connection and RRC idle states. The discussion to follow will focus on operation in the RRC idle state.

A UE utilizing LTE technology may be paged for download traffic or may initiate upload traffic by requesting an RRC connection with the serving base station. n this state, the UE may also reselect to a neighbor cell providing a stronger signal, for which neighbor cell search and measurement may be performed. During the DRX idle times, the UE may monitor one paging occasion, which is equivalent to one LTE subframe in one embodiment.

As previously noted, the objective of neighbor cell search is to detect neighbor cells to identify candidates for reselection/handover. The reliability of neighbor cells may vary based on the probability that there are relatively strong neighbor cells and the rate at which these cells may appear in the sphere of reception of the UE. If there is a low probability that of having neighbor cells or neighbor cells that are relatively strong, the corresponding awake time of a radio in the UE may be kept to a minimum during a paging cycle, as neighbor cell searching may be performed less frequently to conserve battery life.

Determining an appropriate periodicity may depend on predictions of how likely it is to find appropriate neighbor cells in a given situation, and may be based on a number of different metrics. One such metric is the velocity of the UE. As noted above, an accelerometer or other functional unit may be used to determine a velocity of the UE. If the UE is moving fast, it may be beneficial to search for neighbor cells more often, since the environment in which the UE operates may change more frequently. Conversely, if the UE is moving slow or is stationary, less frequent neighbor cell searches may be conducted since the environment of the UE may change slower.

Reference signal receive power (RSSP) is another metric that can be used in determining the periodicity of neighbor searches. If the RSRP is low, the likelihood of finding neighbor cells may be high. In one embodiment, this metric may be combined with UE velocity to yield a higher resolution with respect to the periodicity of the neighbor cell search. For example, if the RSRP is high, even thought the UE is moving fast, it may nevertheless not provide any additional benefit to search for neighbor cells more frequently, since the UE may not be close to the edge of its current cell.

A third metric, reference signal receive quality (RSRQ) is based on a received signal strength indication (RSSI) and RSRP. More particularly, if the level of RSSI is high compared to the RSRP, then it may indicate interference attributable to a neighbor cell. This may in turn indicate that it is beneficial to search more frequently.

Search neighbor strength from previous searches may also be used in determining the periodicity of neighbor cell searches. If the signal to noise (SNR) values of previous PSS and SSS searches are high, the probability that neighbor cells are present. In such a situation, more frequent neighbor cell searches may be beneficial.

Another metric that may be used is signal to interference and noise ratio (SINR). If the receive SINR is low and the RSRP is large, then it is likely that neighbor cells are deteriorating the former. In such a situation, more frequent neighbor cell searches may be beneficial. On the other hand, if SINR is high and RSRP is low, then it is less likely that neighbor cells are present, and thus greater power savings may be realized by performing neighbor cell searches less frequently.

Received block error rate (BLER) is yet another metric that can be used. If the BLER is large in an embodiment where the modulation and coding schemes are robust and RSRP is also large, it is likely that neighbor cells are creating interference that is deteriorating performance with regard to received signals. More frequent neighbor cell searches may thus be warranted. On the other hand, if the BLER is low, it may indicate that neighbor cells are not creating interference, and thus less frequent neighbor cell searches may be conducted.

Figure 5:
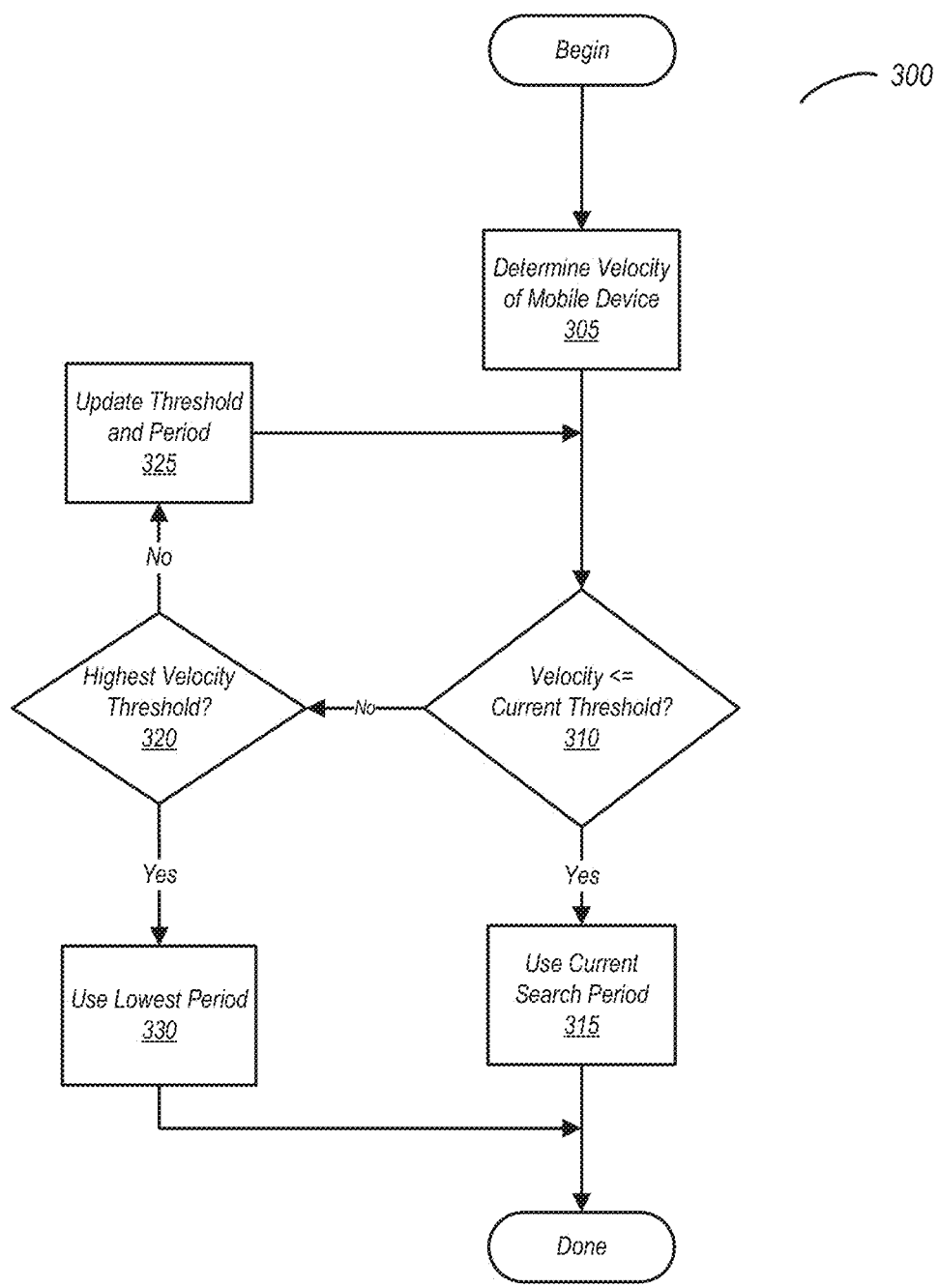
FIG. 5 is a flow diagram illustrating one embodiment of a method for using a velocity of a mobile device to determine a periodicity for performing a neighbor cell search.

FIG. 5 is a flow diagram illustrating one embodiment of a method for determining neighbor cell search periodicity based on the velocity of the UE. In making the determination, a number of different velocity thresholds used. For M velocity thresholds, $V_{TH}=[V_{TH1}, V_{TH2}, \ldots V_{THM}]$. It is noted that the velocity thresholds are listed in ascending order in this embodiment. If there are M+1 corresponding search periods (NSP), then NSP=[$NSP_1$, $NSP_2$, ... $NSP_M$, $NSP_{M+1}$]. It is noted that NSP values are listed in descending order. It is further noted that the search periods are multiples of the idle DRX cycle duration, since searches are only conducted when the radio circuitry is awake during operation in the DRX mode.

The algorithm may begin with setting the search period to its largest value. Pseudo code for the method may be expressed as follows:

- Determine Velocity
- For j = 1 to M
    - if current velocity < $V_{THj}$
    - $NSP_{current} = NSP_j$
    - Exit Loop -continued

- Else
    - continue loop
    - if j = M and NSP$_{current}$ is not set, the UE velocity >V$_{THM}$, and thus NSP$_{current}$ = NSP$_{M+1}$.

The methodology is further illustrated in FIG. 3. Method 300 begins with the determining of the velocity of the mobile device (block 305). The current search period at this time may also be set to the largest search period. The velocity may be determined in one embodiment by an accelerometer implemented in the UE, although other means of determining the UE velocity are possible and contemplated.

If the velocity is less than or equal to a current threshold (block 310, yes), then the current search period may be used (block 315) and the method is complete for the current iteration. If the velocity is greater than the current threshold (block 310, no), but the threshold is not the highest threshold (block 320, no), then the threshold and the search period may be updated for the next iteration (block 325). In the embodiment shown, updating may include increasing the velocity threshold and decreasing the search period. The method may then return to block 310 for another check of the velocity against the velocity threshold.

If the velocity is greater than the current threshold (block 310, no), and the current threshold is the highest possible velocity threshold (block 320, yes), then the lowest period may be used as the neighbor cell search period (block 330).

As noted above, more than one metric may be used to determine the neighbor cell search period. The following discussion is an example of one embodiment in which UE velocity and RSRP may be used in conjunction with one another to determine the periodicity for the neighbor cell search period.

In using the two metrics of velocity and RSRP to determine the neighbor cell search period, a matrix may be formed. The matrix may be an M+1 by N+1 matrix based on M velocity thresholds and N RSRP threshold. For M velocity thresholds, V$_{TH}$=[V$_{TH1}$, V$_{TH2}$, ... V$_{THM}$]. If there are a total of N RSRP thresholds, RSRP$_{TH}$=[RSRP$_{TH1}$, RSRP$_{TH2}$, ... RSRP$_{THN}$]. Based on the M velocity thresholds and the N RSRP thresholds, a matrix of neighbor cell search periods may be formed as follows:

$$\begin{matrix} NSP_{1,1} & NSP_{1,2} & \ldots & NSP_{1,M} & NSP_{1,M+1} \\ NSP_{2,1} & NSP_{2,2} & \ldots & NSP_{2,M} & NSP_{2,M+1} \\ | & | & | & | & | \\ | & | & | & | & | \\ NSP_{N+1,1} & NSP_{N+1,21} & \ldots & NSP_{N+1,M} & NSP_{N+1,M+1} \end{matrix}$$

For values of i=1:N and j=1:N, a lookup algorithm may be performed to determine the corresponding neighbor cell search period, NSP$_{i,j}$. The value of i may be determined by successively comparing a current RSRP value with the RSRP thresholds, RSRP$_{TH}$=[RSRP$_{TH1}$, RSRP$_{TH2}$, ... RSRP$_{THN}$]. If the current RSRP value is less than the minimum threshold, RSRP$_{THN}$, then i=N+1. Similarly, the value of j may be determined by comparing the current UE velocity with the velocity thresholds, or V$_{TH}$=[V$_{TH1}$, V$_{TH2}$, ... V$_{THM}$]. If the current UE velocity is greater than a maximum threshold, V$_{THM}$, then j=M+1.

Figure 6:
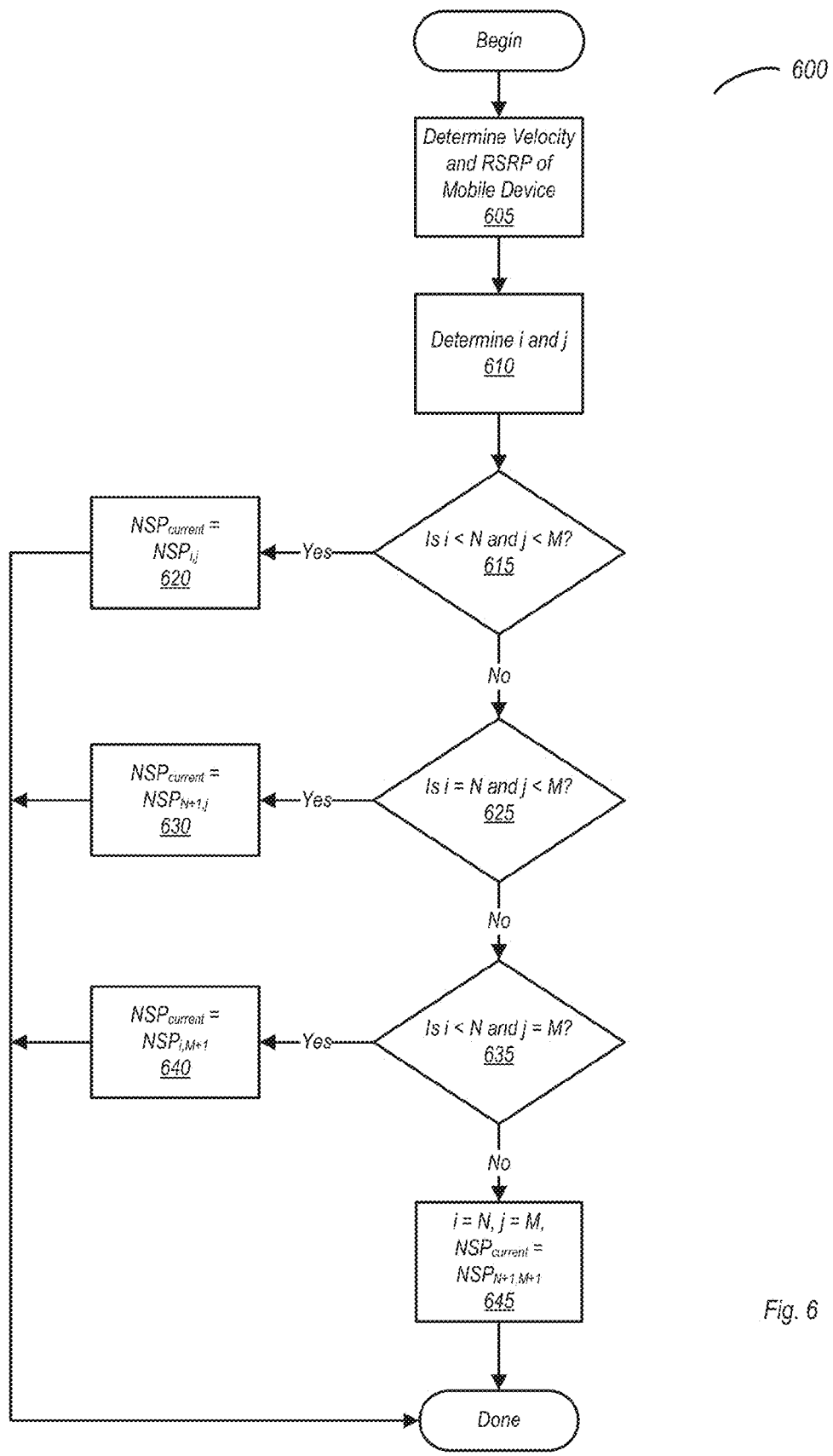
FIG. 6 is a flow diagram illustrating one embodiment of a method for using a velocity and a reference signal receive power of a mobile device to determine a periodicity for performing a neighbor cell search.

FIG. 6 is a flow diagram illustrating one embodiment of a method for using the two parameters, UE velocity and RSRP, to determine a search period. Method 600 may be performed by various embodiments of the hardware discussed above, as well as software that may be executed thereon. Method 600 may also be performed by other embodiments of hardware and software not explicitly discussed herein.

In the embodiment shown, method 600 begins with the determination of the UE velocity (V$_{current}$) and the current RSRP value (RSRP$_{current}$), in block 605. After these values have been determined, the values of i and j may be determined (block 610) in the manner described above. The comparisons of the current UE velocity and the current RSRP values may be done sequentially, in parallel, or in nested loop, depending on the embodiment.

If the determined values of i and j result in i<N and j<M (block 615, yes), then the search period is NSP$_{i,j}$ (block 620). If the determined values of i and j result in i=N and j<M (block 625, yes), then the search period is NSP$_{N+1,j}$ (block 630). If the determined values of i and j result in i<N and j=M (block 635, yes), then the search period is NSP$_{i,M+1}$ (block 640). If none of the cases of blocks 615, 625, or 635 is true, then i=N and j=M (block 645), and thus the search period is NSP$_{N+1,M+1}$.

Figure 7:
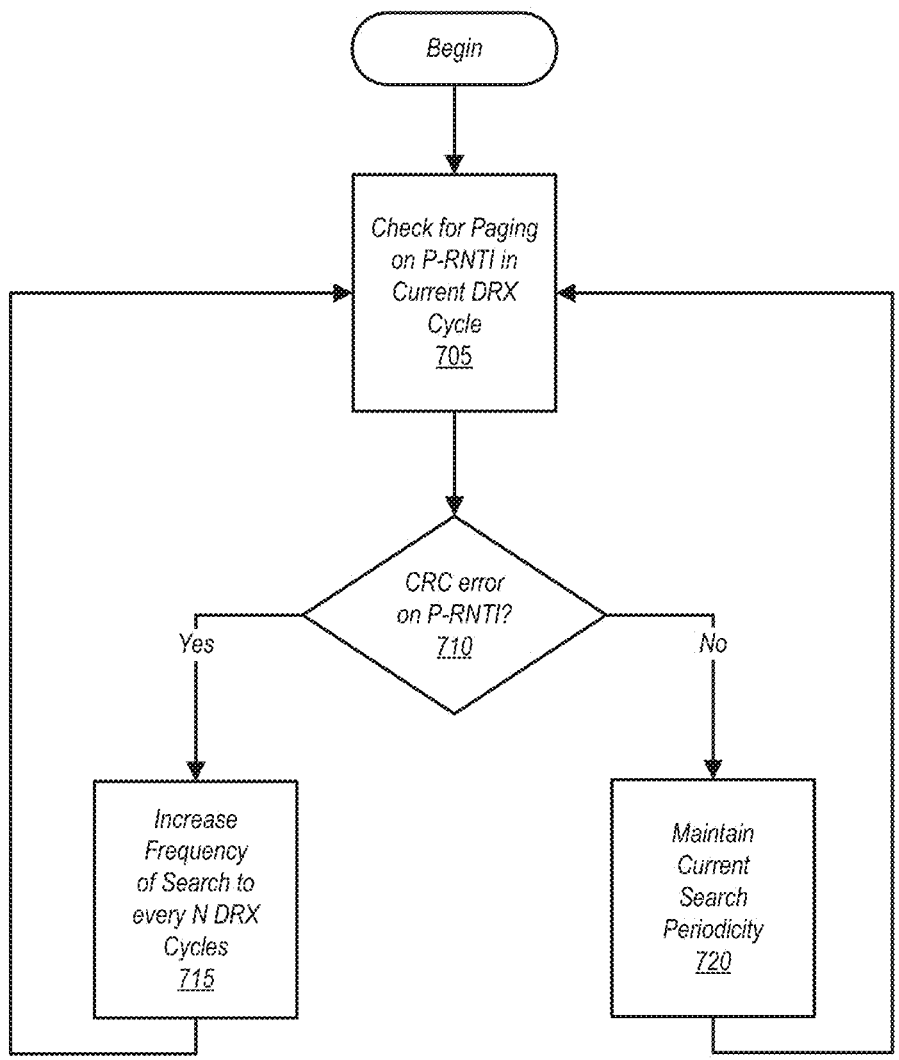
FIG. 7 is a flow diagram illustrating one embodiment of a method for using received block error rate (BLER) for determining a periodicity for performing a neighbor cell search.

FIG. 7 is a flow diagram illustrating one embodiment of a method for using received block error rate (BLER) for determining a periodicity for performing a neighbor cell search. Method 700 may be performed using hardware embodiments discussed above, and may be implemented using software implemented in such hardware embodiments. Furthermore, method 700 may be implemented by embodiments not explicitly discussed herein.

Method 700 begins with a check for paging data via a Paging Radio Network Temporary Identifier (P-RNTI; block 705). The P-RNTI may be used by a UE to identify if a physical channel is addressed to the UE for paging. The paging data sent to the UE may be checked for cyclic redundancy check (CRC) errors. In general, the larger the number of CRC errors in the paging data, the greater the BLER, while smaller numbers of CRC errors correspond to a lower BLER. If a CRC error is detected in the paging data (block 710, yes), then the search may be performed at every N DRX cycles (block 715), wherein N is an integer value. Otherwise, if no CRC errors are detected in the paging data, then the current search periodicity may be maintained (block 720).

Variations of method 700 are also possible and contemplated. For example, a value of BLER over a given time interval may be compared to one or more threshold values. Neighbor cell searches may be performed more frequently for BLER values corresponding to higher BLER thresholds, and less frequently for BLER values corresponding to lower BLER thresholds. Furthermore, BLER may be a metric used in conjunction with other metrics (e.g., as in the matrix described above) to determine an optimal neighbor cell search periodicity.

Numerous variations and modifications will become apparent to those skilled in the art once the above disclosure is fully appreciated. It is intended that the following claims be interpreted to embrace all such variations and modifications.

What is claimed is:

1. A wireless mobile device comprising:
    a system on a chip (SOC) including a processor core; and
    one or more functional units coupled to the SOC and configured to provide signals indicative of parameters of the wireless mobile device to the SOC
    wherein the processor core is configured to cause the wireless mobile device to perform a neighbor cell search at a periodicity based on the parameters of the wireless mobile device, the parameters including a velocity of the wireless mobile device and at least one metric determined by a radio unit of the wireless mobile device, wherein the periodicity is obtained from a value in a matrix that is generated based on one or more velocity thresholds and one or more thresholds from the at least one metric received from the radio unit.

2. The wireless mobile device as recited in claim 1, wherein the one or more functional units include an accelerometer, the processor core is configured to cause the wireless mobile device to perform the neighbor cell search at a periodicity that is based on an indication of the velocity received from the accelerometer.

3. The wireless mobile device as recited in claim 1, wherein the one or more functional units includes the radio unit, wherein the radio unit is configured to transmit and receive radio signals, wherein the processor core is configured to cause the wireless mobile device to perform the neighbor cell search at a periodicity that is based on an indication of a strength of a radio signal received by the radio unit.

4. The wireless mobile device as recited in claim 1, wherein the one or more functional units includes the radio unit, wherein the radio unit is configured to transmit and receive radio signals, wherein the processor core is configured to cause the wireless mobile device to perform the neighbor cell search at a periodicity that is based on an indication of a quality of a reference signal received by the radio unit.

5. The wireless mobile device as recited in claim 1, wherein the one or more functional units includes the radio unit, wherein the radio unit is configured to transmit and receive radio signals, wherein the processor core is configured to cause the wireless mobile device to perform the neighbor cell search at a periodicity that is based on a block error rate of information extracted from a radio signal received by the radio unit.

6. A method comprising:
generating one or more signals indicative of measurements performed by a wireless mobile device; and
performing a neighbor cell search at a periodicity that depends upon results of the measurements performed by the wireless mobile device, wherein the measurements include a velocity of the wireless mobile device and at least one metric measured by a radio unit of the wireless mobile device, wherein the periodicity of the neighbor cell search is obtained from a value of a matrix that is generated based on one or more velocity thresholds and one or more thresholds from the at least one metric received from the radio unit.

7. The method as recited in claim 6, wherein the measurements include a velocity of the wireless mobile device measured by an accelerometer, wherein the method further comprises performing the neighbor cell search at a periodicity based on the velocity of the wireless mobile device.

8. The method as recited in claim 6, wherein the measurements include an indication of a strength of a radio signal received by the wireless mobile device, wherein the method further comprises performing the neighbor cell search at a periodicity based on the strength of the radio signal.

9. The method as recited in claim 6, wherein the measurements include an indication of quality of a reference signal received by the wireless mobile device, wherein the method further comprises performing the neighbor cell search at a periodicity that depends on the quality of the reference signal.

10. The method as recited in claim 6, wherein the measurements include an indication of a block error rate in information received by the wireless mobile device, and wherein the method further comprises performing the neighbor cell search at more frequent intervals responsive to detecting an increase in the block error rate.

11. A mobile cellular device comprising:
an integrated circuit, wherein the integrated circuit includes a system on a chip (SOC) having at least one processor core; and
an accelerometer configured to generate an indication of a velocity of the mobile cellular device;
a radio unit configured to transmit and receive radio signals,
wherein the processor core is configured to determine a frequency at which a neighbor cell search is performed by the cellular mobile device based on a velocity of the cellular mobile device and one or more metrics determined by the radio unit, wherein the frequency at which the neighbor cell search is performed is indicated by a value obtained from a matrix that is generated based on one or more velocity thresholds and one or more thresholds from the one or more metrics received from the radio unit.

12. The mobile cellular device as recited in claim 11, wherein the processor core is configured to increase the frequency of the neighbor cell search responsive to receiving an indication that the velocity has increased to a point above a threshold value.

13. The mobile cellular device as recited in claim 12, wherein the processor core is configured to decrease the frequency of the neighbor cell search responsive to receiving an indication that the velocity has decreased to a point below the threshold value.

14. The mobile cellular device as recited in claim 11, wherein the one or more metrics includes one or more of the following:
a received signal strength indication;
quality of a received reference signal;
a block error rate of information received by the wireless mobile device.

15. A method comprising:
generating one or more signals indicative of two or more measurements performed by a wireless mobile device, wherein the two or more measurements are based on two or more corresponding metrics of the wireless mobile device; and
performing a neighbor cell search at a periodicity that depends upon the two or more measurements and two or more corresponding threshold values of the two or more corresponding metrics, wherein the two or more metrics include a velocity of the wireless mobile device as indicated by an accelerometer and at least one of one or more radio metrics as indicated by a radio unit;
wherein the method further comprises:
comparing the velocity to one or more velocity thresholds;
comparing one of the radio metrics to one or more corresponding radio metric thresholds;
reading an element of a matrix corresponding to results of said comparing the velocity and said comparing the one of the radio metrics, wherein the element of the matrix indicates the periodicity of the neighbor cell search.

16. The method as recited in claim 15, wherein the matrix is an M+1 by N+1 matrix based on M velocity thresholds and N radio metric thresholds.

17. The method as recited in claim 15, wherein the one or more radio metrics include one or more of the following:
a received signal strength indication;
quality of a received reference signal;

a block error rate of information received by the wireless mobile device.

18. A wireless mobile device comprising:
a system on a chip (SOC) including a processor core;
an accelerometer configured to determine a velocity of the wireless mobile device; and
a radio transceiver configured to transmit and receive radio signals;
wherein the processor core is configured to determine a period at which neighbor cell searched are performed based on an indication of the velocity and at least one measurement of a radio metric received from the radio transceiver, perform a comparison of a velocity to one or more velocity thresholds and compare the radio metric to one or more radio metric thresholds, and obtain a current neighbor cell search period from a matrix having a plurality of neighbor cell search periods, wherein the current neighbor cell search period is based on results of the comparisons to one or more velocity thresholds and one or more radio metric thresholds.

19. The wireless mobile device as recited in claim 18, wherein the matrix is an M+1 by N+1 matrix based on M velocity thresholds and N radio metric thresholds.

20. The wireless mobile device as recited in claim 18, wherein the radio metric is an indication of a quality of a received reference signal.

21. The wireless mobile device as recited in claim 18, wherein the radio metric is an indication of a received signal strength.

* * * * *